(12) United States Patent
Hofmann

(10) Patent No.: US 8,803,022 B2
(45) Date of Patent: Aug. 12, 2014

(54) WELDING HEAD

(75) Inventor: Stefan Hofmann, Wetzlar (DE)

(73) Assignee: Newfrey LLC, Newark, DE (US)

(*) Notice: Subject to any disclaimer, the term of this patent is extended or adjusted under 35 U.S.C. 154(b) by 1346 days.

(21) Appl. No.: 11/947,887

(22) Filed: Nov. 30, 2007

(65) Prior Publication Data
US 2008/0128392 A1    Jun. 5, 2008

(30) Foreign Application Priority Data

Nov. 30, 2006  (DE) .......................... 10 2006 058 180
Nov. 22, 2007  (EP) ..................................... 07022667

(51) Int. Cl.
*B23K 9/20* (2006.01)

(52) U.S. Cl.
USPC .................... 219/74; 219/97; 219/98; 219/99

(58) Field of Classification Search
CPC ....................................................... B23K 9/20
USPC ...................... 219/74, 97–99, 130.5
See application file for complete search history.

(56) References Cited

U.S. PATENT DOCUMENTS

| | | | |
|---|---|---|---|
| 2,406,474 A | | 8/1946 | Perrin |
| 2,413,189 A | | 12/1946 | Nelson |
| 2,439,830 A | * | 4/1948 | Varela ............................. 219/98 |
| 4,465,917 A | * | 8/1984 | Heider ............................. 219/98 |
| 5,502,291 A | * | 3/1996 | Cummings ...................... 219/98 |
| 6,630,642 B2 | * | 10/2003 | Hoellinger ....................... 219/98 |
| 6,762,392 B1 | * | 7/2004 | Krengel et al. ................. 219/99 |
| 7,045,741 B2 | | 5/2006 | Schmitt |

FOREIGN PATENT DOCUMENTS

| | | |
|---|---|---|
| DE | 15 65 003 | 5/1970 |
| DE | 196 38 287 | 4/1998 |
| DE | 200 18 096 | 3/2002 |
| DE | 102 53 415 | 5/2004 |
| DE | 10 2004 060 389 | 7/2006 |
| EP | 1649962 | 4/2006 |
| FR | 2754198 | 4/1998 |
| GB | 678955 | 9/1952 |
| GB | 2 042 391 | 9/1980 |
| JP | 9024472 | 1/1997 |
| JP | 2001150139 | 6/2001 |
| SU | 591279 | 2/1978 |

OTHER PUBLICATIONS

Machine Translation of DE102004060389, Nelson, Jul. 6, 2006.*
European Search Report for EP 07 02 2667 dated Mar. 31, 2008, 8 pages, plus German language copy, 7 pages.
European Search Report for EP 07 02 2667 dated Jul. 10, 2008, 15 pages.

* cited by examiner

*Primary Examiner* — Brian Jennison
(74) *Attorney, Agent, or Firm* — Harness, Dickey & Pierce, P.L.C.

(57) ABSTRACT

The invention relates to a welding head for a welding device for welding components which are not rotationally symmetrical onto workpieces such as for example metal sheets, with a head attachment, the head attachment having a holding device for the component and being designed for carrying a welding current to the component, wherein the holding device is mechanically connected by means of a connecting device to an interface device, via which the welding current can be supplied, the connecting device being subdivided into a first connection piece and a second connection piece, which are electrically insulated from each other.

15 Claims, 3 Drawing Sheets

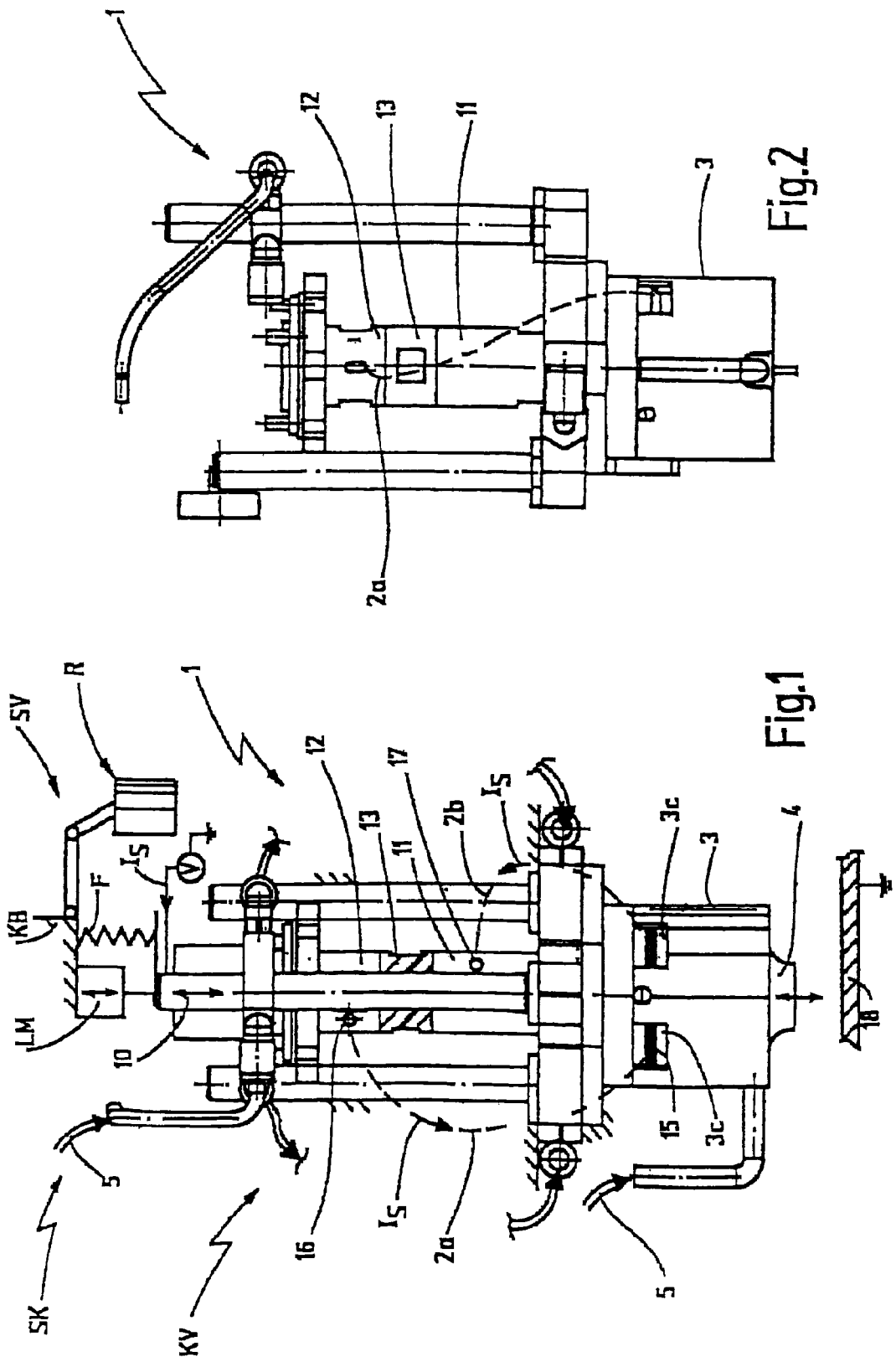

WELDING HEAD

CROSS-REFERENCE TO RELATED APPLICATIONS

This application claims priority to EPO Patent Application No. 07 022 667.5, filed Nov. 22, 2007, which claims priority to German Patent Application No. 10 2006 058 180.6 filed Nov. 30, 2006. The disclosures of the above applications are incorporated herein by reference.

FIELD

The present invention relates to a welding head.

BACKGROUND

Such a welding head such as that known from DE 10 2004 060 389 A1 may serve for welding metallic components that are not rotationally symmetrical (for example holders, earth flanges or the like) onto metallic workpieces, such as for example body sheets of motor vehicles. The component generally has in this case a welding surface which is much longer in one direction than in the direction transverse thereto.

The basic technology for this type of welding process corresponds to what is known as stud welding. The welding-on operation is consequently performed with preference by the rapid drawn-arc method with magnetic arc deflection.

Devices for drawn-arc welding by means of magnetic arc deflection have long been known and have proven successful in practice. For example, U.S. Pat. No. 2,406,474 from 1946 already shows a device or stud welding and a circuit for stabilizing a welding arc. For this purpose, the invention uses a coil with a winding which is connected in series to the conductor of the welding current. This has the consequence that a magnetic field is formed at the same time as the welding current flows. The stud holder, which is located in the centre of the coil, serves as a coil core.

In U.S. Pat. No. 2,413,189 shows a device for welding studs which is intended for manual use. The document also shows that it is necessary to make the supply lead for the welding current flexible, since it is necessary according to the method to move the stud holder away from the workpiece in a lifting movement.

DE 1 565 003 likewise shows a device for welding fastening elements by arc stud welding on the drawn-arc principle. In this device too, a coil comprising a winding is connected in series to the welding current and arranged around the welding location. The purpose of these devices is, on the one hand, to avoid a blasting effect of the arc and, on the other hand, to produce rotation of the arc when welding tubular components (fastening elements).

DE 102 53 415 discloses a method and a device for welding on rectangular sheet metal brackets. This device likewise has a coil arrangement, which is intended to produce a linear movement of the arc. By contrast with the documents mentioned further above, in this case the coil arrangement is not connected in series with the welding current.

The use of protective gas by means of directing it as a stream is disclosed in DE 196 38 287. Here, protective gas is directed onto the joining location from the side and makes oxide-free soldering possible, since the ambient air is blown away by the stream applied.

However, a disadvantage of the aforementioned methods and devices is that cables carrying welding current have to be laboriously led out from the device housing into the front welding region. The rigidity and, most particularly, the inert mass of these welding-current-carrying cables, which have to be relatively sturdy on account of the high current intensity, lead to hindrances in the sequences of movements. In the case of arc stud welding by the drawn-arc method, reciprocating movements take place in the range of milliseconds and therefore represent highly dynamic processes.

SUMMARY

On the basis of this knowledge, an object of the present invention is to provide a welding head of the simplest construction and low mass which preferably also has a magnetic coil of the simplest possible construction which is fed by the welding current and for which a small inert mass suffices.

A further object of the invention is to provide a device which, by the way it directs protective gas, enhances the welding characteristics when welding bracket-type holders.

According to a first aspect of the present invention, the above object is solved by a welding head according to claim 1, wherein the holding device is mechanically connected by means of a connecting device to an interface device, via which the welding current can be supplied, wherein the connecting device is subdivided into a first connection piece and a second connection piece, which are electrically insulated from each other. The welding head according to the invention is typically fastened to an arm of a robot or the like. The welding head normally comprises a head base which is fixedly connected to the arm and which may comprise a drive like a linear motor for driving the holding device, for example. Further, the welding head typically comprises a head front end (head attachment), which includes the holding device and is preferably compactly formed so as to allow joining components onto workpieces at locations that are difficult to access.

Such welding heads are typically used in the car manufacturing industry, wherein the rotationally non-symmetric components are welded onto body sheets, where they serve as holder or anchor for various fastening objectives (cable, lines, etc.). In addition, the head basis typically includes the electronic interface to an energy supply unit. The welding currents that are used in the present context are relatively high and are typically introduced from the head base into the holding device of the head front end. In the prior art, the holding device is fully electrically conductive and, thus, can directly guide the welding current into the welding component.

According to the invention, the holding device is mechanically connected by means of a connecting device to an interface device. The interface device serves to connect the head front end with the head base. The interface device can be a mechanical interface as well as an interface for other supplies (as for the electrical welding current, for protective gas, etc.). In view of the interface device as provided, it is comparably easy to separate the head front end from the head base so that the head front end can easily be exchanged (for maintenance purposes or the like).

The connecting device is separated into a first and a second connection piece which are electrically insulated from each other. Thus, an electrical current introduced into the interface device cannot be introduced directly via the connecting device into the holding device. This arrangement allows to directly serially connect a further electrical load to the head front end, by connecting the further electrical load with one end to the first connection piece and with the other end to the second connection piece. Thereby, the welding current flows from the interface device into the first connection piece of the connecting device, and from there into the additional electrical load, and from there into the second connection piece, wherein the electrical current is led from the second connection piece into the holding device and thus into the welding component.

It is advantageous that the electrical wiring can be made directly at the head front end and can thus be formed in a spatially compact manner. In other words, it is not necessary to supply an additional electrical load via a wiring from the head base. Although the inventive welding head is preferably used in combination with welding components which are not rotationally symmetrical, it is also conceivable to use the welding head with welding components that are rotationally symmetrical.

In addition, it is possible to use the welding head on a manual welding device (welding pistol). In this case, the same advantages arise as in the use on an automated robot. Thus, the object is completely solved. It is particularly advantageous if the first connection piece is electrically connected to a first electrical connection of a coil device (which forms an additional electrical load), so that the welding current can be conducted from the interface device via the first connection piece into the coil device.

This embodiment is particularly advantageous if the welding process conducted with the inventive welding head is performed with magnetic arc deflection. The magnetic arc deflection is achieved via the electromagnetic field that is produced by the coil device. The coil device can be arranged in an area around the welding component, for example. In this respect, it is particularly advantageous if the second connection piece is electrically connected to the holding device and to a second electrical connection of the coil device, so that the welding current can be conducted from the coil device via the second connection piece and the holding device into the component.

According to another preferred embodiment, the first and the second connection pieces are aligned with each other in the direction of the welding axis. For instance, the first and the second connection pieces can have the shape of a rod, wherein an electrically insulating piece is arranged between the connection pieces. Thus, a radially compact construction can be achieved.

According to another preferred embodiment, the first and the second connection pieces are electrically insulated from each other by means of an electrical insulating piece, and are mechanically connected to each other via the electrical insulating piece. Thus, a simple construction can be achieved.

Further, it is advantageous if the head front end comprises a mouthpiece, which is arranged substantially around the component during a welding operation, the holding device and the mouthpiece being designed such that they are movable in relation to each other along the welding axis. In this embodiment, for example, the mouthpiece is substantially rigidly connected to the head base via suitable fastening means, whereas the holding device can be moved in relation thereto via an electrical drive device which is provided at the head base.

It is to be noted that a linear motor engages preferably at the connecting device in the region of the interface device, so that the linear motor moves the connecting device and the holding device connected thereto. It is particularly advantageous if at least one of the two connection pieces is connected via an assigned welding current cable to a coil device, which is fixed on the mouthpiece, the welding current cable being preferably inserted into the mouthpiece at an upper region of the latter. In this embodiment, a coil device provided in the region of the mouthpiece can be connected to the first connection piece in a compact manner. In addition, the introduction of the welding current cable at an upper region of the mouthpiece allows that a front end region of the mouthpiece can be formed with the least possible disruptive contours.

According to a second aspect of the present invention, the head front end comprises the mouthpiece, wherein a coil device with at least one winding is arranged at the mouthpiece, the coil device being arranged within an outer wall of the mouthpiece. In this embodiment it is possible to properly protect the coil device against outer mechanical forces. It is particularly advantageous if the mouthpiece has an annular space, within which the coil device is arranged.

In this embodiment, the coil device is not only protected against mechanical influences from the outside, but also from inside of the mouthpiece. Furthermore, it is advantageous if the mouthpiece is of a multipart form, with an inner part, within which the component is held and on the outer side of which the coil device is arranged, and with an outer part, which encloses the coil device and forms the outer part of the mouthpiece. Due to the two part form, the mouthpiece can be easily manufactured. Further, it is preferred, if the outer part has at least one clearance or opening for leading through a welding current cable. The clearance is provided preferably in an upper region of the mouthpiece, so that disruptive contours can be avoided as far as possible.

According to a third aspect of the present invention, a mouthpiece is provided at the welding head, wherein a protective gas supply device is arranged at the mouthpiece, the protective gas supply device having at least one nozzle, which is arranged in such a way that the component within the mouthpiece can be blasted substantially tangentially. The advantage here is that an amount of gas is provided which is sufficient at any times in order to securely cover the welding region. The protective gas supply device can, for example, be attached to the mouthpiece and to means for fastening the mouthpiece to the head base, respectively. In addition, an interface device via which the head front end can be connected to the head base, may include a protective gas interface and a protective gas connection, respectively.

It is particularly advantageous if the head front end comprises an upper opening, via which protective gas blown into the mouthpiece can be discharged upwards. It is particularly advantageous if such an upper opening is provided at the mouthpiece, so that protective gas blown into the mouthpiece can be discharged upwards between the mouthpiece and the connecting device or the holding device, respectively, for example.

According to a fourth aspect of the present invention, a mouthpiece is provided at the welding head front end, wherein a protective gas supply device is arranged at the mouthpiece, the protective gas supply device having at least one supply channel, which is led from the outside to the mouthpiece and is led into the interior of the mouthpiece at a lower region of the mouthpiece. In this embodiment, the supply channel is rigidly provided at the head front end, and can thus be formed with little disruptive contours. The protective gas can be introduced into the supply channel in the region of the interface device, wherein suitable channels can lead the protective gas with few disruptive contours from there to the lower region of the mouthpiece.

It is particularly advantageous if the head front end has a fixed portion which is rigidly connected to the head base and which comprises the protective gas mouthpiece. Further, the supply channel can be fixedly connected to the fixed portion of the head front end. In general, it is advantageous if a part of the head front end that is movable with respect to the head base on the one hand receives the welding current via the interface device and on the other hand is mechanically fixed to a drive device for driving the movable part.

In this embodiment, the movable part may particularly include the connecting device and the holding device. Furthermore, it is advantageous if the connecting cables for connecting the connection pieces with the additional electrical load (e.g. the coil device) are led around the connecting device essentially in the shape of a helical line. Thus, axial relative movements between the connecting device and the coil device (which is typically fixedly arranged at the mouthpiece) can be resiliently compensated in a simple manner.

It goes without saying that the features mentioned above and those still to be explained can be used not only in the combinations specified but also in other combinations or on their own without departing from the present invention.

DRAWINGS

Exemplary embodiments of the invention are explained in more detail in the description which follows and are represented in the drawings, in which:

FIG. 1 is a front elevational view of a welding device with a welding head according to one embodiment of the invention;

FIG. 2 is a side elevational view of the welding device of FIG. 1;

DETAILED DESCRIPTION

Figure 3:
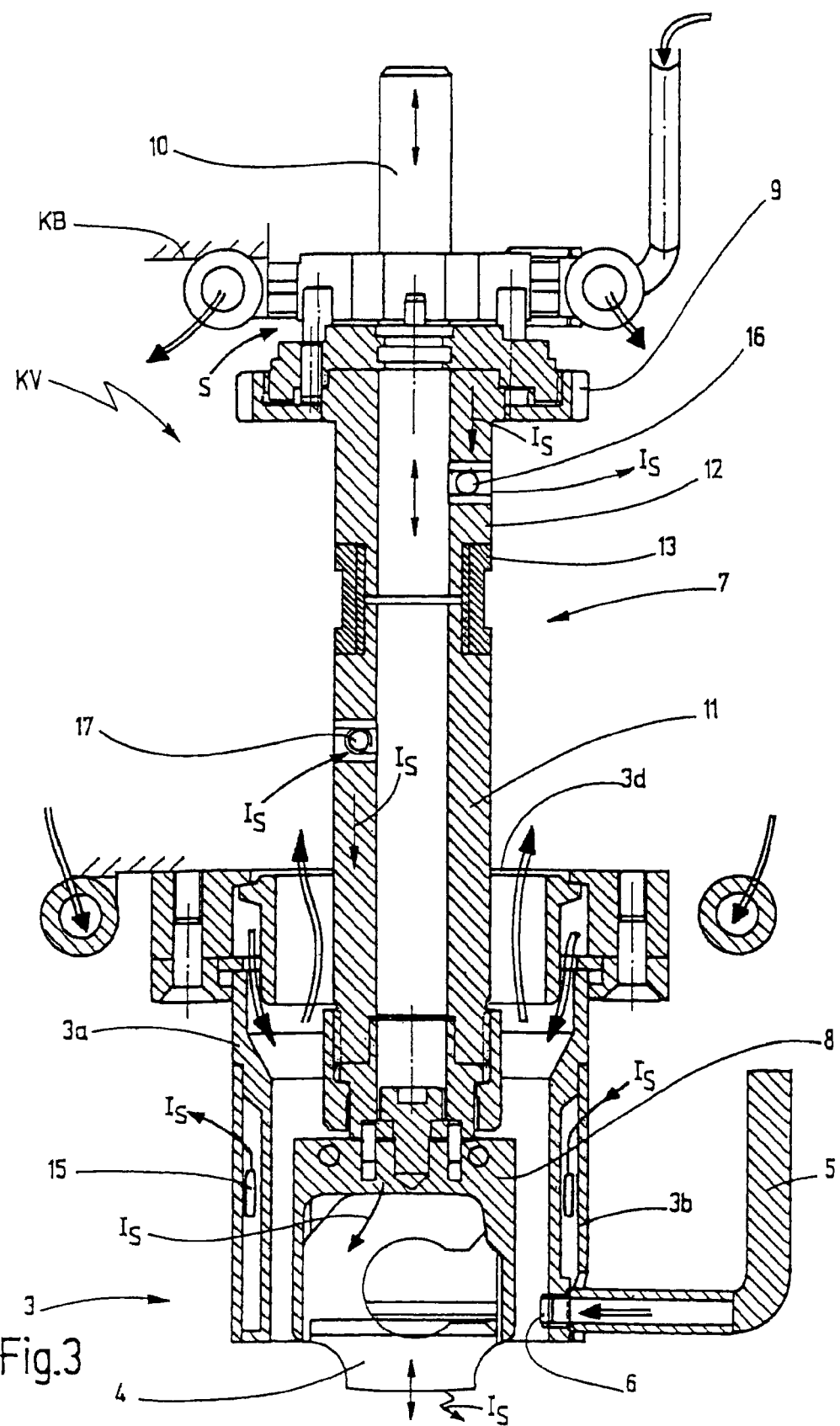
FIG. 3 is a longitudinal cross sectional view through a head attachment of the welding head shown in FIGS. 1 and 2.

In FIG. 1 a welding device SV for welding components which are not rotationally symmetrically onto workpieces such as for example vehicle body sheets 18 is shown. The welding device SV includes a robot R which may for example be formed as a robot with articulated arms. A welding head SK is attached to a manipulating end of the robot R. The welding head SK comprises a head base KB which is rigidly attached to the manipulating end of the robot R. The head base KB includes a linear motor LM (or another type of drive), which is adapted to move a component (e.g. a welding component or Weldfast®-bracket, respectively) in relation to the head base KB, wherein the movement is made along a longitudinal welding axis which is shown in FIG. 1 to extend from top to bottom.

The welding head SK further comprises a head front end (head attachment) KV. The head attachment KV is connected to the head base KB via an interface device S. The interface device S includes a mechanical interface (e.g. a screw connection). Further, the interface device S includes an electrical interface for transferring a welding current from the head base to the head front end KV.

In the figures, the head front end KV is shown at reference numeral 1. The welding device SV further comprises a welding voltage supply V, which supplies a welding current $I_S$ to the head base KB. The welding current $I_S$ is led via the interface device (cf. FIG. 3) to the head front end KV.

As is shown in FIGS. 1 and 2, the head front end KV comprises two longitudinal struts which are arranged in parallel to the welding axis and which extend from the interface device S in direction to a bottom end of the head front end KV. A ring portion is arranged at a lower end of the struts, wherein a protection gas mouthpiece 3 is attached to a lower end of the ring portion. The protective gas mouthpiece 3, thus, is rigidly connected to the head base KB.

The head front end KV further comprises a connecting device (or connecting flange) 7. The connecting device has essentially the shape of a rod and extends from the interface device S through the ring portion. An upper end of the connecting device 7 is connected to an interface connection piece 10. The interface connection piece 10 is connected to the linear motor LM. Further, it is possible to bias the connecting device 7 in the direction to the bottom along the welding axis direction, using a spring F, as is schematically shown in FIG. 1. The linear motor LM may in this case be adapted exclusively for fast lifting movements against the spring force of the spring F.

An upper region of the connecting device 7 is axially guided or radially supported by means of the interface device S. In this region, the interface device S comprises a nut connection, wherein the head front end KV can be mechanically fixed to the head base KB by means of a nut and the nut connection, for example.

A lower end of the connecting device 7 is axially guided or radially supported within the ring portion (this not being shown in the figures in detail). Optionally, it may be possible to dispense with an axial guidance or radial support in this area.

A holding device 8 is provided at a lower end of the connecting device 7, the holding device 8 serving to receive a component (welding element). The holding device 8 may for example be adapted to clampingly hold a welding component 4.

The connecting device 7 is subdivided in the axial direction into an upper connection piece 12 and a lower connection piece 11. The upper connection piece 12 and the lower connection piece 11 are connected to each other via an electric insulating piece 13, such that the connection pieces 11, 12 are electrically insulated from each other.

The upper connection piece 12 is connected to the interface connection piece 10 into which the welding current $I_S$ is introduced in the region of the head base KB. The lower connection piece 11 is mechanically and electrically connected to the holding device 8.

As explained above, a mouthpiece 3 is attached to the lower ring portion of the head front end KV, in a position so that the mouthpiece 3 substantially surrounds a component 4 held by the holding device 8. The mouthpiece 3 comprises a mouthpiece inner sleeve 3a and a mouthpiece outer sleeve 3b arranged concentrically thereto. A coil device (MAC coil, i.e. a coil for magnetic arc deflection) is arranged between the sleeves 3a, 3b.

Figure 4:
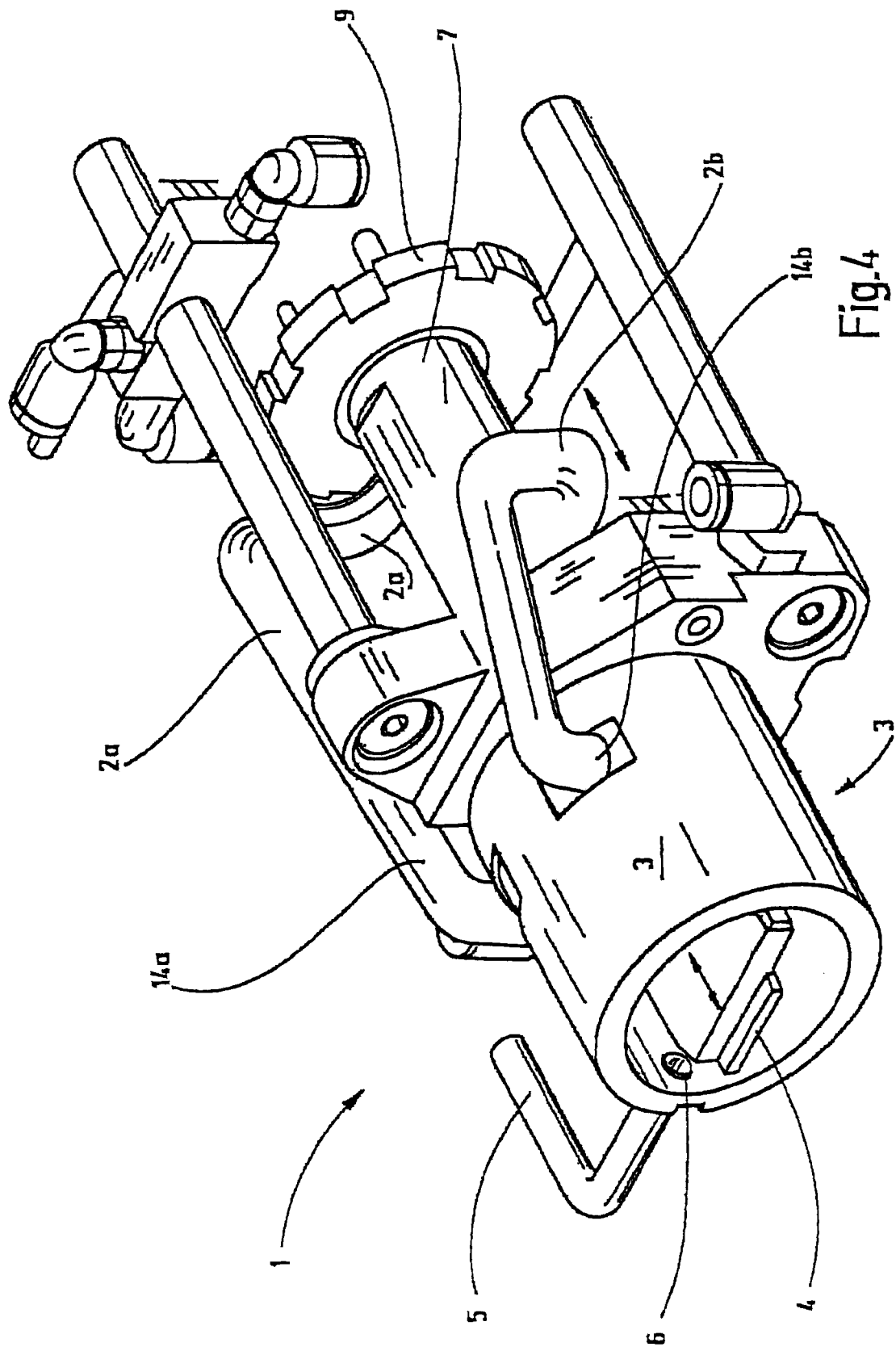
FIG. 4 is a side perspective view of the head attachment of FIG. 3.

As is particularly shown in FIGS. 1, 2, and 4, one end of the coil device 15 is connected to the upper connection piece 12 (via a coil input 14a) at a connection point 16. The welding current cable used to this purpose is shown in the figures at 2a. An output end (coil output) 14b of the coil device 15 is correspondingly connected to a connection part 17 of the lower connection piece 12 of the connecting device 7 via a welding current cable 2b. As is shown in FIGS. 1, 2, and 4, the welding current cables 2a, 2b can be led essentially helically or at least windingly from the connecting device to the mouthpiece 3.

The mouthpiece 3 comprises two clearances 3c which are formed at the mouthpiece outer sleeve 3b, as is shown in FIG. 1. The welding current cables 2a, 2b can be connected to the coil device via these clearances 3c.

As is shown in FIG. 1, protective gas is supplied to the head front end KV in the region of the interface device S, wherein the protective gas supply is shown at 5. The protective gas is led from the upper part of the head front end KV which is fixedly connected to the head base KB via suitable protective gas lines to the lower ring portion of the head front end KV, and, from the lower ring portion the protective gas is led via corresponding lines to a nozzle via which the protective gas can be introduced into the inside of the mouthpiece 3. The nozzle penetrates the inner sleeve 3a and the outer sleeve 3b and is arranged in relation to a central welding axis such that the protective gas flows tangentially onto the component 4 within the mouthpiece 3.

In FIGS. 3 and 4, an outlet opening of the nozzle which points into the inside of the mouthpiece 3, is shown at reference numeral 6. In the figures the path and flow of protective gas is shown with double arrows.

It can be seen in FIG. 1 that protective gas cannot only be led from the lower ring portion of the head front end KV to a protective gas supply 5, via which protective gas can be introduced into the mouthpiece at a lower portion thereof. However, it is also possible, as is shown in FIG. 3, to let the protective gas additionally flow in axial direction from above into the mouthpiece 3. An outflow opening is arranged generally at an upper end of the mouthpiece 3, such that protective gas exits the mouthpiece 3 upwards, namely between the connecting device 7 (the lower connection piece 11) and the ring portion of the fixed part of the head front end KV.

The welding current cables 2a, 2b as well as the lines for supplying and distributing the protective gas can be formed exclusively at the head front end KV. Only one single terminal for supplying protective gas is necessary, which is shown in FIG. 1 on the left top side. In addition, as necessary, the electrical welding current cables 2a, 2b and the protective gas lines can be installed at the head front end KV in a radially relatively compact manner, so that the head front end KV has only small and radially limited disruptive contours. The entire head front end KV can be removed relatively simply via the interface device S from the head base KB, e.g. for maintenance or replacement purposes.

In addition, it is not necessary to divide the welding current in the region of the head base KB into a current to be led through the coil device 15 and a current to be led into the holding device 8. Rather, a simple current connection in the area of the interface device S is sufficient. The serial connection of the coil device 15 may be made exclusively in the region of the head front end KV in an advantageous manner, namely from the connection point 16 to the coil device 15 and from the coil device 15 to the connection point 17, from where the current can then be led into the holding device 8 and into the component 4.

As is shown in FIG. 1, the component 4 can preferably be welded onto a workpiece like a sheet, which is electrically connected to earth (ground), for example. In a welding process, the robot R (or a slide provided between the head base KB and a manipulating end of the robot R) is moved such that the mouthpiece 3 is placed onto the sheet 18. Thereby, the component 4 which protrudes from the mouthpiece 3 is moved resiliently inwards and is placed within the mouthpiece 3 on the workpiece 18. Subsequently, a pilot arc can be drawn and the component 4 can be lifted via the linear motor LM from the workpiece 18 (without lifting the mouthpiece 3).

Subsequently, the full welding current can be switched on, so that the lower end of the component 4 and an opposed portion of the workpiece 18 are melted. Subsequently, the component 4 can be lowered again onto the workpiece 18, either via the spring F or via the linear motor LM (or both). Subsequently, the welding current is switched off, so that the component 4 is rigidly connected with the workpiece 18.

During this process, a magnetic arc deflection occurs as the welding current is led through the coil device 15. In addition, protective gas can be supplied at suitable times. Further details are explained below.

The front end or head attachment 1 according to the invention for a welding head SK has a protective gas mouthpiece 3 and a connecting device (a connecting flange) 7. The head attachment KV can be connected to the head base KB by means of an interface device S. The connecting device has connection pieces 11 and 12, which are insulated from each other by an insulating piece 13 mechanically connecting them. Arranged at the lower end of the connection piece 11 is the welding element holder 8 (holding device), which is located centrally in the protective gas mouthpiece 3 and centrally surrounded by a MAC coil 15, the coil being arranged within an outer wall 3b of the mouthpiece 3. The mouthpiece 3 is of a multipart form, with an inner part 3a, within which a welding element or component 4 is held and on the outer side of which the coil device 15 is arranged, and with an outer part 3b, which encloses the coil device 15 and forms the outer wall of the mouthpiece 3.

At the lower end of the protective gas mouthpiece 3 there is a first protective gas supply 5 for the protective gas necessary for welding. This is introduced into the interior space in such a way that the protective gas stream flows tangentially along the welding element 4 to be welded. This type of protective gas supply has the advantage that there is always an adequate amount of gas available to allow the welding area to be reliably covered. On account of the fact that the stream of protective gas is relatively stable (stiff) as a result of the volumetric flow, the welding location is also effectively protected from ambient influences such as drafts.

It has been found in tests that it is appropriate under some circumstances to provide two outlet openings 6, which may be arranged opposite each other. This is expedient whenever a particularly high volumetric flow is required. Furthermore, protective gas may be additionally directed from above into the inner mouthpiece 3. The gas displaced out of the mouthpiece is discharged via an upper opening 3d.

The current $I_S$, required for the welding process is introduced into the connecting flange 7 via a connection shank 10 of the interface device S, to be precise into the upper connection piece 12. To introduce the current into the coil 15, the current is taken from the connection point 16 of the connection piece 12 and passed to the coil input 14a of the MAC coil 15 via the welding current cable 2a. In the coil 15, the current passes through at least one winding and is picked off again at the coil output 14b and returned to the connecting flange 7, but via a connecting point 17 to its lower connection piece 11. This is electrically connected to the holding device 8, and consequently to the component 4.

If a welding process is initiated, the welding head SK moves together with the front end 1 towards the workpiece 18. The welding element 4 comes into contact and a monitoring signal can be detected (here: low voltage in the short-circuit). The mouthpiece 3 sets down on the workpiece 18. Subsequently, the welding process is initiated, having the effect firstly that protective gas flows onto the welding location. With a brief delay, a pilot arc is struck. After switching on the pilot current, the welding element 4 is lifted off from the workpiece 18, by means of the drive device LM. An arc forms. As soon as it is stable, the welding current is switched on.

As already mentioned further above, the current is looped through the coil 15 before it reaches the welding element 4. This has the advantage in particular that the magnetic field forms synchronously with respect to the welding current $I_s$. If an alternating current source is used, the direction of the field changes and a moving arc is additionally obtained. In the case represented with a welding element 4 of a rectangular cross section, the arc would migrate along the underside of the welding flange in the form of a figure of eight on its side.

From a purely functional and mechanical viewpoint, the way in which the current is led through according to the invention has the further advantage that the disruptive contours become many times smaller. Furthermore, it is no longer necessary to lead the thick and inflexible welding current cable out of the housing of the welding head SK or a welding gun and wind them around the protective gas mouthpiece. When the front end 1 is changed, for example because of a repair or because of a refit, it is possible as in the case of conventional welding heads for the drawn-arc welding method variant to exchange the front end without laboriously having to remove welding current cables. If it is just required to exchange the protective gas mouthpiece 3, as a result of a collision etc. all that is necessary is to disconnect the connections of the welding current cables 2a and 2b and this allows the mouthpiece to be unscrewed. It follows from this that the welding head according to the invention is also very easy to maintain.

What is claimed is:

1. A welding head for a welding device for welding a component which is not rotationally symmetrical onto a workpiece including a metal sheet, comprising:
   a head base;
   a head attachment connected to the head base by a drive device operable to move the head attachment with respect to the head base, the head attachment including:
      a holding device for temporarily holding the component for welding and carrying a welding current to the component; and
      a mouthpiece arranged to surround the component during a welding operation, the holding device and the mouthpiece movable in relation to each other along a welding axis;
   an interface device;
   a connecting device, the holding device mechanically connected by the connecting device to the interface device, the connecting device operating to supply the welding current, the connecting device subdivided into a first connection piece resiliently biased with respect to the drive device by a spring and a second connection piece electrically insulated from the first connection piece and connected to the mouthpiece;
   a coil device;
   a first welding cable connected to a connection point of the first connection piece and to the coil device permitting the welding current to be conducted from the interface device via the first connection piece into the coil device while being electrically insulated from the second connection piece; and
   an electrical insulating piece positioned between and electrically insulating the first and second connection pieces from each other, the electrical insulating piece positioned above the coil device outside of the mouthpiece.

2. The welding head according to claim 1,
   wherein the second connection piece is electrically connected to the coil device by a second welding cable such that the welding current is conducted from the coil device by the second welding cable to the second connection piece and via the second connection piece and the holding device into the component.

3. The welding head according to claim 1, wherein the coil device is fixed on the mouthpiece, and the first welding cable is inserted into the mouthpiece at a region of the mouthpiece opposite from a contact location between the workpiece and the component.

4. The welding head according to claim 1, wherein the first and second connection pieces are aligned with each other in a direction of the welding axis.

5. A welding head for a welding device for welding a component onto a workpiece, comprising:
   a head base;
   a head attachment connected to the head base by a drive device operable to move the head attachment with respect to the head base, the head attachment including:
      a holding device for temporarily holding the component for welding and carrying a welding current to the component; and
      a mouthpiece arranged to surround the component during a welding operation, the mouthpiece having a mouthpiece inner sleeve and a mouthpiece outer sleeve arranged concentrically thereto, the holding device and the mouthpiece movable in relation to each other along a welding axis;
   a connecting device subdivided into a first connection piece and a second connection piece electrically insulated from the first connection piece by an insulating piece, the connecting device operating to supply the welding current; and
   a coil device including a magnetic arc deflection coil positioned between the inner and outer sleeves of the mouthpiece and thereby surrounding the component, the coil device having at least one winding supplied with the welding current by a welding current cable carrying the welding current from the first connection piece to the coil device while being insulated from the second connection piece by the insulating piece, the welding current thereafter conducted by a second welding current cable also connected to the coil device and extending through a wall of the mouthpiece to a connection part of the second connection piece;
   a protective gas supply device positioned proximate the mouthpiece and having at least one nozzle connected at a lower portion of the mouthpiece extending through both the inner and outer sleeves of the mouthpiece and arranged to blast the component positioned within the inner sleeve of the mouthpiece tangentially with a protective gas such that the protective gas is always available to cover the welding area.

6. The welding head according to claim 5, wherein the head attachment includes an upper opening to discharge the protective gas from the mouthpiece in an upward direction.

7. The welding head according to claim 5, further comprising:
   an interface device;
   the holding device mechanically connected by the connecting device to the interface device; and
   the coil device having the at least one winding connected in series at a first electrical connection to the holding device.

8. The welding head according to claim 5, wherein the second connection piece is electrically connected to the holding device and to a second electrical connection of the coil device by the second welding current cable, the welding current conducted from the coil device via the second connection piece and the holding device into the component.

9. A welding head for a welding device for welding a component which can be non-rotationally symmetrical onto a metal workpiece, comprising:
   a head base;

a head attachment connected to the head base, the head attachment including:
    a holding device for temporarily holding the component for welding and carrying a welding current to the component; and
    a mouthpiece arranged to surround the component during a welding operation, the holding device and the mouthpiece movable in relation to each other along a welding axis;
a coil positioned between inner and outer sleeves of the mouthpiece;
first and second welding current cables, the first cable extending through the mouthpiece to supply the welding current to the coil and the second cable extending through the mouthpiece to transfer the welding current from the coil to the holding device;
a protective gas supply device connected at a lower end of the mouthpiece, the protective gas supply device having a single supply channel which is led from outside the mouthpiece into an interior of the mouthpiece through both the inner and outer sleeves such that the protective gas flows tangentially onto a welding location of the component;
the mouthpiece further including an outflow opening arranged at an upper end of the mouthpiece such that the protective gas exits upward from the upward end of the mouthpiece.

10. The welding head according to claim 9, wherein the head attachment includes a fixed portion rigidly connected to the head base.

11. The welding head according to claim 10, further comprising:
    an interface device; and
    a connecting device, the holding device mechanically connected by the connecting device to the interface device, the connecting device operating to supply the welding current.

12. The welding head according to claim 11, wherein the connecting device is subdivided into a first connection piece and a second connection piece electrically insulated from the first connection piece between the first connection piece and a ring portion of a fixed part of the connecting device.

13. The welding head according to claim 12, further comprising an insulating piece positioned between and electrically insulating the first connection piece from the second connection piece.

14. The welding head according to claim 11, comprising a part of the head attachment movable with respect to the head base and operable to receive the welding current via the interface device.

15. The welding head according to claim 14, further comprising a drive device, wherein the head attachment is connected to the head base by the drive device operable to move the head attachment with respect to the head base.

* * * * *